United States Patent [19]
Pettipiece

[11] 3,753,152
[45] Aug. 14, 1973

[54] ELECTRICAL WAVE PUMPED PULSED LASER

[75] Inventor: Kenneth J. Pettipiece, Brentwood, Calif.

[73] Assignee: The United States of America as represented by the United States Atomic Energy Commission, Washington, D.C.

[22] Filed: Feb. 2, 1972

[21] Appl. No.: 222,785

[52] U.S. Cl. .............................................. 331/94.5
[51] Int. Cl. ................................................ H01s 3/09
[58] Field of Search .................................. 331/94.5

[56] References Cited
UNITED STATES PATENTS

| | | | |
|---|---|---|---|
| 3,553,603 | 1/1971 | Leonard | 331/94.5 |
| 3,641,454 | 2/1972 | Krawetz | 331/94.5 |
| 3,673,513 | 6/1972 | Gregg et al. | 331/94.5 |
| 3,571,745 | 3/1971 | Altman et al. | 331/94.5 |
| 3,623,145 | 11/1971 | Gregg et al. | 331/94.5 |

Primary Examiner—William L. Sikes
Attorney—Roland A. Anderson

[57] ABSTRACT

A pulsed laser wherein emission is generated from a gaseous gain medium, the gain medium being pumped by at least one traveling high voltage electromagnetic pulse having a duration too short for inducing formation of an ionization discharge in the medium. The gaseous gain medium is contained in a vessel having a pair of conductors which provide a waveguide for conducting the electromagnetic pulse through the gaseous gain medium. Pulsed laser emission is obtained in an oscillatory mode or in an amplification mode.

20 Claims, 4 Drawing Figures

ELECTRICAL WAVE PUMPED PULSED LASER

BACKGROUND OF THE INVENTION

The invention described herein was made in the course of, or under, Contract No. W-7405-ENG-48 with the United States Atomic Energy Commission.

This invention relates to laser systems, particularly to pulsed laser systems, and more particularly to a method and apparatus for generating pulsed laser emission from a gaseous gain medium which is pumped by a traveling high voltage electromagnetic pulse having a duration too short for inducting formation of an ionization discharge in the medium.

It is generally known that conduction of a high voltage pulse of electrical energy through a gaseous lasing medium will induce pulsed laser emission. Specifically, a portion of the electrical energy is deposited or absorbed by the gaseous medium to generate the necessary population inversion in a metastable energy state which can be depleted by stimulated radiation transitions. However, the amount of energy which can be deposited in the gaseous medium is limited by ionization breakdown of the gas, since, upon an ionization breakdown, the electrical pulse is conducted through the medium and it does not deposit a significant portion of its energy in the medium.

However, the gaseous gain medium will tolerate a voltage considerably in excess of its DC ionization breakdown potential for a finite period of time. This finite period is the time required for an electron to appear and to form an avalanche discharge. Prior to the formation of the avalanche discharge, the gaseous gain medium is considered to be in a "resistive phase" in which it will absorb a substantial portion of the energy in an electrical pulse. Accordingly, by impressing very high voltage electrical pulses with rise times less than 10 nanoseconds across a gaseous lasing medium, a significant amount of energy can be deposited in the gas, a large portion of which is available for lasing action. U. S. Pat. No. 3,571,745 issued Mar. 23, 1971 to D. E. Altman et al. provides a more complete explanation of the above phenomenon, as well as a technique for utilizing the above phenomenon for pumping a gaseous lasing medium.

While electrical discharge pulsed laser systems are known in the art as exemplified by U. S. Pat. No. 3,432,664 issued Mar. 11, 1969 to J. B. Robison, and U. S. Pat. No. 3,553,603 issued Jan. 5, 1971 to D. A. Leonard, these prior known systems are complicated and do not have a sufficiently short pulse duration to prevent the formation of an ionization or avalanche discharge in the medium.

SUMMARY OF THE INVENTION

The present invention relates to a method and means for generating pulsed laser emission from a gaseous gain medium, wherein a population inversion in a lasing energy state is excited in the gain medium by at least one traveling, high voltage electromagnetic pulse having a duration too short to induce formation of an ionization or avalanche discharge in the medium. A gain medium, as set forth herein, is defined as any medium capable of having a population inversion in an energy state which can be discharged by stimulated emission radiation transitions.

More particularly, the present invention provides a pulsed laser system that propagates a very high voltage electromagnetic wave through a gaseous gain medium which either directly excites a population inversion in the gain medium, or triggers an explosive energy release which subsequently excites a very high degree population inversion in the medium.

Basically, the inventive system structurally includes a vessel containing the gaseous gain medium, which for example may be an explosive gaseous mixture; conductive means within or forming part of the vessel for guiding an electromagnetic wave through the medium; and means for generating at least one extremely high voltage, fast rise time, short duration electromagnetic wave connected to the conductive means. Pulsed laser emission is obtained either in an oscillatory mode, wherein light-reflecting means reflect spontaneous emissions from the excited gain medium repetitively back through the medium subsequent to passage of the electromagnetic wave pulse through the medium; or in an amplification mode, wherein stimulating radiation is directed into and through the excited gain medium either during or subsequent to introduction and propagation of the electromagnetic wave pulse through the medium. Also, the inventive system provides the advantages of simplicity and ease of construction.

Therefore, it is an object of this invention to provide an electrical wave pumping method for producing pulsed laser emission.

A further object of the invention is to provide a laser system wherein the gain medium is pumped by a traveling high voltage electromagnetic pulse having a duration too short for inducing formation of an ionization discharge in the medium.

Another object of the invention is to provide a laser system wherein a gaseous gain medium is contained in a vessel having conductor members which provide a waveguide for conducting an electromagnetic pulse through the vessel.

Another object of the invention is to provide a pulsed laser system utilizing an explosive gaseous mixture as the gain medium, and wherein a short, high voltage pulse serves to initiate an explosive release of chemical energy suitable for pumping either an inert or a reaction product lasing species of the gaseous mixture.

Another object of the invention is to provide a method and means for producing pulsed laser emission by electrical wave pumping in either an oscillatory mode or an amplification mode.

Other objects of the invention will become readily apparent to one skilled in the art from the following description and accompanying drawings.

DESCRIPTION OF THE INVENTION

As set forth above the invention is directed to a method and apparatus for generating pulsed laser emission from a gaseous gain medium wherein a population inversion in a lasing energy state is excited in the gain medium by a traveling, high voltage electromagnetic wave or pulse having an extremely fast rise time and a duration too short to induce formation of an ionization or avalanche discharge in the medium. Also, the laser system, as pointed out above includes a vessel containing the gaseous gain medium and conductor members which provide a waveguide for conducting the electromagnetic pulse through the gaseous gain medium. The electromagnetic wave or pulse either directly excites a population inversion in the gain medium, or triggers an explosive energy release which subsequently excites a very high degree population inversion in the medium.

As also pointed out above the inventive system is capable of producing pulsed laser emission either in an oscillatory mode or in an amplification mode of significant energy content.

In the oscillatory mode, spontaneous emissions from the excited gain medium are amplified by stimulated radiation transitions in the gain medium, until the population inversion created therein is depleted. One of said reflecting means is partially transmissive of the stimulated laser emission light.

In the amplification mode, the stimulating radiation pulse is amplified by stimulated radiative transitions as it passes through the excited gain medium.

The illustrated embodiments of the invention utilizes a gain medium composed of an explosive mixture of gases which combine in an exothermic chemical reaction, and which can be initiated by a high voltage, fast rise time, electromagnetic wave pulse having a duration too short to induce an ionization discharge in the medium. The exothermic chemical reaction must be of the class which releases energy suitable for pumping either an inert lasing species or a lasing reaction species or product of the chemical reaction at a rate sufficient to generate a population inversion in that lasing species in a time interval comparable to the desired timewidth of the laser emission pulse.

Figure 1:
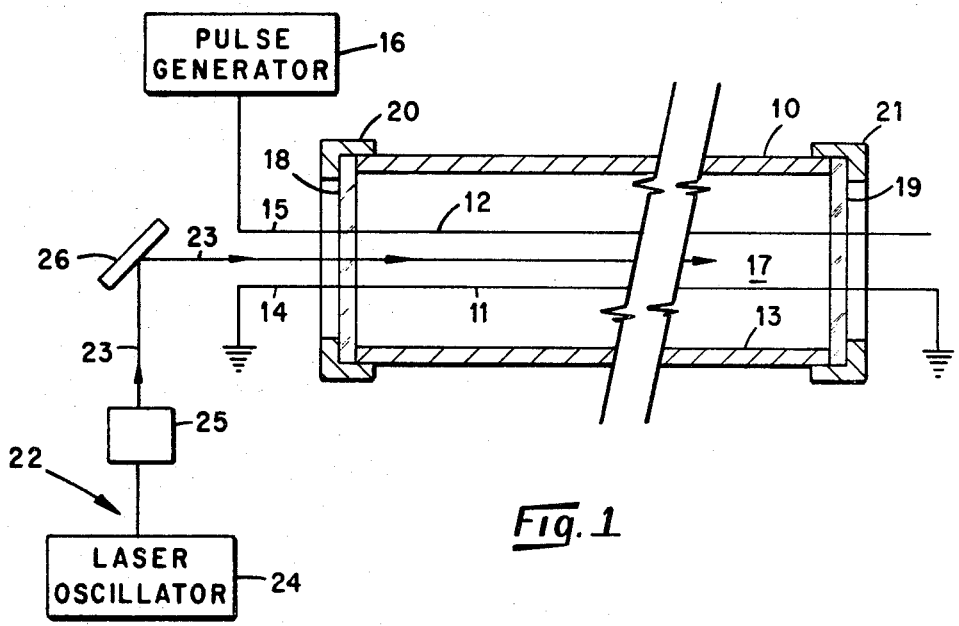
FIG. 1 is a schematic illustration of an embodiment of the invention utilized in an amplification mode.

FIG. 1 illustrates an embodiment of the inventive system for obtaining pulsed laser emission in the amplification mode. As illustrated, the system comprises a cylindrical vessel 10 composed of a high strength, nonconductive material, such as Teflon or glass, a pair of internally mounted conductive rods or electrodes 11 and 12, such as tungsten, located on diametrically opposite sides of a cavity 13 formed by vessel 10. Conductive rod 11 is electrically connected to ground via lead 14. Conductive rod 12 is electrically connected via lead 15 to an electromagnetic pulse generator 16 capable of providing a fast rise time pulse having a voltage, for example, on the order of 600 keV and a duration less than 5 nanoseconds. Suitable electromagnetic pulse generators include typical Blum line pulse-forming networks such as a 706 Febatron manufactured by Field Emission Corporation. Conductive rods 11 and 12 form a waveguide for conducting electromagnetic pulses from generator 16 through vessel 10. Vessel 10 is filled with an exposive gaseous mixture 17 which has a lasing reaction species or product which is pumped by the chemical energy released upon initiation of the explosive gaseous mixture 17, such, for example, as nitrogen-trifluoride ($NF_3$) and hydrogen ($H_2$). Suitable classes of gaseous mixtures 17 are described in U. S. Pat. No. 3,623,145 issued Nov. 23, 1971, and copending U. S. Pat. application Ser. No. 65,758 filed June 22, 1970, and Ser. No. 146,948 filed May 26, 1971, each assigned to the same assignee. Windows 18 and 19, positioned at each end of vessel 10, are constructed of material, such as sapphire, which is transmissive of stimulated emission radiations from the lasing species contained in vessel 10. Windows 18 and 19 are maintained in place on the ends of vessel 10 by end caps or retainers 20 and 21, respectively, which may be bonded or otherwise secured to the vessel. While not shown, windows 18 and 19 may be positioned at the Brewster angle, if desired. Means generally indicated at 22, is provided for introducing a shaped pulse of stimulating radiation, indicated by the arrows 23, into one end of vessel 10 after passage of an electromagnetic pulse from generator 16 through medium 17. Means 22 includes a conventional laser oscillator 24 generating light of an appropriate wavelength for stimulating radiative transitions in the pumped lasing species contained in vessel 10, a light pulse shaping means 25, such as a pair of Pockel cells, and a light deflecting means 26 such as a mirror, so as to direct the shaped stimulating radiation pulse 23 through vessel 10 intermediate conductive rods 11 and 12, rods 11 and 12 functioning as a waveguide for conducting the electromagnetic pulse from generator 16 through the vessel.

Operation basically is as follows: the vessel 10 is filled with explosive gaseous mixture 17 at permissible pressures ranging from less than 10 millimeters of mercury up to greater than 5 atmospheres. An electromagnetic (EM) pulse from the pulse generator 16 propagates through vessel 10 between the conductive rods 11 and 12 initiating an explosive chemical reaction of the gaseous mixture 17. Energy released by the reaction generates the population inversion in the lasing reaction species or product, which amplifies the stimulating light pulse 23 directed into the vessel 10, either while or a finite period $T_o$ after the EM pulse begins to propagate through the vessel.

The voltage and timewidth parameters of the EM pulse are chosen so as to deposit the maximum amount of energy in the gaseous medium without inducing an ionization or avalanche discharge. These parameters will vary according to the breakdown characteristics of different gas mixtures or mediums, the particular pressure at which the system is operated and the spacing between the conductive rod means within the vessel. For example, a 50-torr mixture of nitrogen-trifluoride and hydrogen ($NF_3 - H_2$) with a mixture ratio of 6-to-1 requires approximately a 2 nsec, 600 keV EM pulse, where the conductive rod spacing is 2 cm.

After passage of the EM pulse through the gaseous mixture, a finite time interval $T_r$ will elapse before the rate of energy release from the chemical reaction is sufficiently high to generate a high degree or "threshold" inversion in the lasing species for significant lasing action. This inversion threshold will move down the vessel at approximately the same speed as the EM pulse.

Where directed stimulated light, such as pulse 23, is present as the inversion generates and propagates down the vessel, the inversion zone is depleted as it forms, and an amplified laser pulse having a timewidth $T$ is generated. The timewidth $T$ is equal to the time differential between the light transit time $t$, through the vessel and the EM pulse transit time $t_2$ through the vessel, i.e.: $T = L (1/v_e - 1/c)$ where $L$ is the length of the vessel, $v_e$ is the velocity of the EM pulse in the electrodes and $c$ is the velocity of light in the gain medium.

In the absence of directed stimulating light, after reaching the threshold, the degree of inversion will continue to increase to a maximum or peak as the reaction progresses, whereupon spontaneous emission and other interactions begin to deplete the inversion. The populating inversion will have a finite lifetime $t_i$ after reaching the threshold level. In addition, there will be a spatial zone or region of population inversion in the medium which propagates through the vessel at essentially the same velocity as the initiating EM pulse. For example, in the described chemical system, this spatial zone would be approximately 50 to 60 nanoseconds ($T_r$) behind the initiating EM pulse. The thickness ($w$) of the spatial zone can be determined from the expression: $w = t_i v_e$ where $v_e$ is the velocity at which the EM pulse propagates through the vessel between the conductor means (conductive rods 11 and 12). The velocity of propagation $v_e$ of the EM pulse is calculable using signal propagation theory in transmission lines. Per this theory, $v_e$ is approximately 0.6 the speed of light.

Accordingly, at a finite time interval $T_o$ after the EM pulse begins to propagate through the vessel, a pulse of stimulating light can be directed into the vessel. If this finite time interval $T_o$ is chosen per the expression: $T_o = T_r + T_i - T_p$, where $T_p$ is the stimulating pulse width, the stimulating light pulse is introduced into the "back end" of the spatial inversion zone and during the inversion forming at the input end of the vessel. Accordingly, the light pulse propagates through the inversion zone as the zone itself propagates through the vessel, undergoing amplification by the stimulated radiative emission transitions in the zone. At some distance $L$, the amplified wave front of the stimulating light pulse will overtake the "front end" of the spatial inversion zone. That distance $L$ can be determined from the expression:

$$L = (v_e^2 t_i)/(c - v_e)$$

where $c$ is the speed of light in the gaseous gain medium.

According to the present invention, the amplifying cavity 13 of vessel length should be at least equal to $L$ in order to maximize the energy content of the generated pulse. Moreover, an amplifying cavity of length $L$ should minimize the rise time of the generated pulse. Finally, the intensity $I$ and duration $T_s$ of the stimulating light pulse should be sufficient to initially deplete the spatial inversion zone.

While the above detailed description of the theory of the invention has been directed to a chemical laser system operated in an amplification mode, it is also applicable to the oscillatory mode described hereinafter with respect to FIG. 2. In addition, the invention is also applicable where the amplification pulse directly pumps a lasing species in the gaseous medium. Other systems wherein the inventive concept applies include embodiments where the electrical pulse directly excites a particular chemical or elemental species which then, by collisional interaction, pumps the lasing species contained in the vessel, or where the electromagnetic pulse initiates a chemical reaction which pumps an inert lasing species by collisional interaction.

Figure 2:
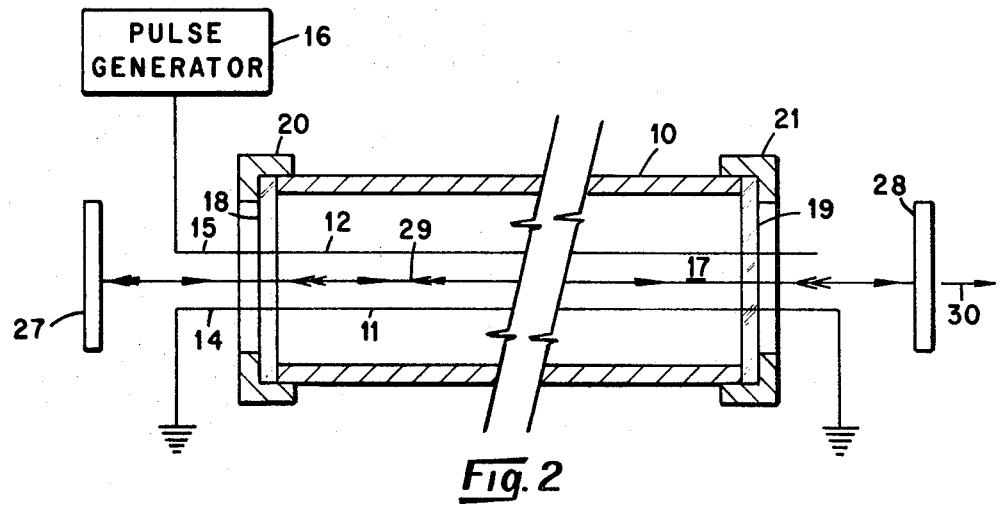
FIG. 2 is a schematic illustration of an embodiment of the invention as utilized in an oscillatory mode.

Referring now to FIG. 2, an embodiment of the invention in the oscillatory mode is illustrated. Components similar to those abovedescribed with respect to FIG. 1 will be given like reference numerals. As will be readily seen by a comparison of FIGS. 1 and 2, the embodiments are similar except in FIG. 2 the means 22 of the FIG. 1 embodiment is omitted and a reflective means composed, for example, of mirrors 27 and 28 are utilized. Mirror 27 is substantially 100 percent reflective while mirror 28 is partially transmissive such that a major portion of the stimulated emission radiations initiated by the electromagnetic pulse from generator 16 passing through the explosive gaseous medium 17 in vessel 10 is reflected by mirror 28 back through the medium 17 to mirror 27 as indicated by the double-arrows 29 whereupon it is reflected by mirror 27 back through the medium 17 in an oscillatory mode as known in the art, a smaller portion of the emission radiation passes through mirror 27 as indicated by output beam or pulse 30.

While the conductive members within vessel 10 have been illustrated as rods 11 and 12, it is within the scope of this invention to replace the rods with a pair of coaxially spaced members forming a waveguide therebetween such that in the FIG. 1 embodiment, for example, the beam or pulse 23 from means 22 is directed between the coaxial conductive members.

Figure 3:
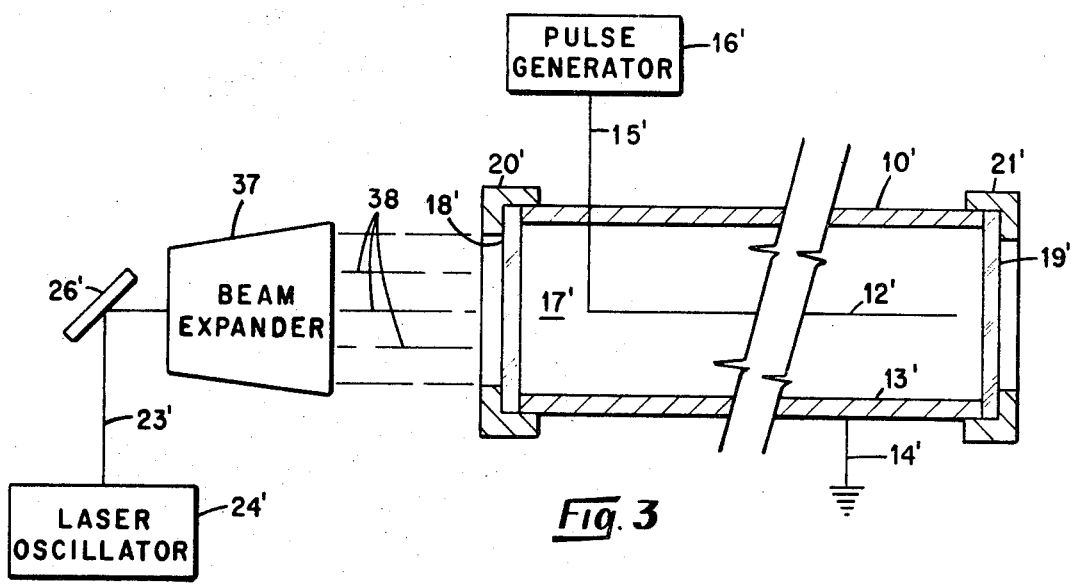
FIG. 3 is a schematic illustration of an embodiment of the invention utilizing a coaxial conductor arrangement.

Referring now to FIG. 3, an embodiment of the invention is illustrated utilizing one of the coaxial conductive members as a substitute for the non-conductive housing or vessel 10 in the FIG. 1 embodiment, and thus like elements will be given corresponding reference numerals. More specifically, the FIG. 3 system comprises a hollow electrically conductive member 11' connected electrically to ground by lead 14' and defining the sidewalls of a cavity or chamber 13'. An electrically conductive rod or member 12' located centrally within cavity 13' is connected electrically via a lead 15' to a pulse generator 16' as in the FIG. 1 embodiment. While not shown, conductive member 12' is electrically insulated from member 11' at the point where it passes through member 11'. Cavity or chamber 13' is closed at each end of conductive member 11' by windows 18' and 19' retained in position by end caps 20' and 21', respectively. Chamber 13' contains a suitable explosive gaseous mixture 17'. As in the FIG. 1 embodiment, windows 18' and 19' may be positioned at the Brewster angle, if desired. A shaped pulse of stimulating radiation indicated at 23' from a laser oscillation 24' is directed by a light deflecting means 26' into a beam expander 27 which expands the pulse 23' to the cross-sectional configuration of the internal surface of the hollow conductive member 11' as indicated at 28. If desired, a light pulse shaping means such as Pockel cells 25 in FIG. 1 may be utilized. Operation of the FIG. 3 embodiment is essentially the same as in the FIG. 1 embodiment and thus readily understood from the above description.

It is readily seen that the FIG. 3 embodiment, illustrated in the amplification mode, can be operated in the oscillatory mode by substituting reflective members, as in the FIG. 2 embodiment, for the elements 22', 26' and 27.

Figure 4:
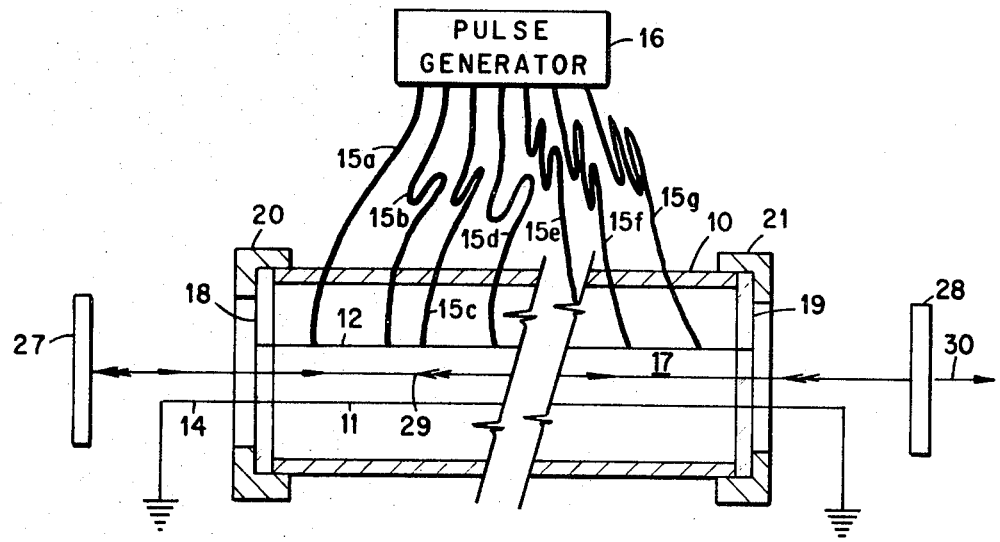
FIG. 4 is a schematic illustration of an embodiment of the invention wherein pulses are directed into various portions of the conductor.

FIG. 4 is an embodiment similar to FIG. 2 but utilizes a plurality of electromagnetic (EM) pulses in a staged or stepped arrangement instead of each pulse propagating the length of the vessel 10. In the FIG. 4 embodiment, a plurality of EM pulses are simultaneously emitted from generator 16' via a plurality of leads 15a–15g, each lead 15a–15g being longer in length than the preceding lead such that the various pulses through leads 15b–15g arrive at conductive member 12 in a preselected timed sequence. The length of each of the successive leads 15b–15g is approximately longer by 0.6 times as long as the distance between where they connect to member 12' than the preceding lead such that the EM pulse transmitted therethrough travels down the member 12' with an effective velocity equal to the speed of light through the gaseous gain medium.

While the FIG. 4 embodiment has been illustrated in the oscillatory mode, it can be utilized equally effectively in the amplification mode by replacing the reflector means with stimulating radiation pulse generating means as in the FIGS. 1 and 3 embodiments.

It has thus been shown that the present invention provides a method and means wherein at least one high voltage, fast rise time, electromagnetic pulse or wave, having a duration too short to induce formation of an ionization or avalanche discharge, is propagated through a gain medium to generate the necessary population inversion for laser emission.

What I claim is:

1. A method for generating pulsed laser emission from a gaseous gain medium comprising the steps of: forming a longitudinally extending waveguide means for a very high voltage traveling electromagnetic pulse in a vessel means having portions thereof transmissive of stimulated emission radiations; containing a gaseous gain medium under pressure in the vessel means; and directing at least one short very high voltage traveling electromagnetic pulse having a rise time less than 10 nanoseconds through the gaseous gain medium within the vessel means via the waveguide means producing pulsed laser emission from the gaseous gain medium without inducing formation of an ionization discharge in the medium.

2. The method defined in claim 1, wherein the step of forming the waveguide means is accomplished by positioning a pair of electrically conductive members in spaced relation within the vessel means, and additionally including the step of forming at least a portion of the vessel means from electrically nonconductive material.

3. The method defined in claim 1, wherein the step of forming the waveguide means is accomplished by utilizing a pair of coaxial electrically conductive members in spaced relationship.

4. The method defined in claim 3, wherein the step of utilizing a pair of coaxial electrically conductive members for forming the waveguide means is accomplished by one of the coaxial members defining at least part of the vessel means and the other of the coaxial members being positioned with the one coaxial member.

5. The method defined in claim 1, wherein the step of containing the gaseous gain medium is carried out by filling the vessel means with an explosive gaseous mixture at a pressure in the range between about 10 millimeters of mercury and about 5 atmospheres.

6. The method defined in claim 1, wherein the step of directing the traveling electromagnetic pulse through the gaseous gain medium includes the step of generating a plurality of fast rise time pulses and sequentially directing the pulses through the medium in a predetermined time sequence such that the effective velocity of the traveling electromagnetic pulse down the waveguide means is equal to the speed of light in the gaseous gain medium.

7. The method defined in claim 1, wherein the step of directing the traveling electromagnetic pulse through the gaseous gain medium includes the step of generating a fast rise time pulse having a voltage of about 600 keV and a duration less than about 5 nanoseconds.

8. The method defined in claim 1, additionally including the steps of introducing a pulse of stimulating radiation into and through the gaseous gain medium in the vessel means and amplifying the introduced stimulating radiation by the population inversion of the gaseous gain medium produced by the propagation of the traveling electromagnetic pulse through the vessel means.

9. The method defined in claim 1, additionally including the step of repetitively reflecting at least a portion of the pulsed laser emission produced by directing the traveling electromagnetic pulse through the gaseous gain medium back through the vessel means increasing the gain thereby.

10. An apparatus for producing pulsed laser emission from a gaseous medium without inducing formation of an ionization discharge in the medium comprising: a vessel means; waveguide means constructed of electrically conductive members for conducting traveling electromagnetic pulses through substantially the length of said vessel means; said vessel means being provided with window-like portions transmissive of stimulated emission radiations; at least one of said conductive members being electrically grounded; at least one of said conductive members being electrically connected to a pulse generating means capable of producing short, high voltage traveling pulses having rise times less than 10 nanoseconds; said vessel means containing a gaseous gain medium under pressure; whereby at least one short, high voltage traveling electromagnetic pulse from said generating means propagates through substantially the length of said vessel means via said waveguide means, initiating a population inversion in said gaseous gain medium thereby producing a pulsed laser emission without inducing the formation of an ionization discharge in the medium.

11. The apparatus defined in claim 10, wherein said vessel means is constructed of high strength electrically nonconductive material and of cylindrical configuration, and said window-like portions thereof are located at opposite ends of said cylindrical vessel means, and wherein said conductive means comprise a pair of conductive rod-like means mounted on diametrically opposite sides of said vessel means.

12. The apparatus defined in claim 10, wherein said vessel means constitutes one of said electrically conductive members, and said window-like portions thereof are located at opposite ends of said one of said electrically conductive members, another of said electrically conductive members being positioned coaxially within said one of said electrically conductive members.

13. The apparatus defined in claim 10, wherein said pulse generating means includes a plurality of conductive leads operatively connected in sequence to one of said conductive members, each of said successive leads being longer in length than the preceding lead.

14. The apparatus defined in claim 10, wherein said pulse generating means is of the type capable of producing a fast rise time pulse having a voltage of about 600 keV and a duration of less than about 5 nanoseconds.

15. The apparatus defined in claim 10, wherein said gaseous gain medium within said vessel means has a pressure in the range from about 10 millimeters of mercury to about 5 atmospheres.

16. The apparatus defined in claim 10, wherein said gaseous gain medium is composed of an explosive gaseous mixture.

17. The apparatus defined in claim 16, wherein said explosive gaseous mixture is composed of nitrogen-trifluoride and hydrogen in a ratio of about 6-to-1 and at a pressure of about 50-torr, wherein said electrically conductive members are spaced from each other at about two cm, and whrein said traveling electromagnetic pulse has a voltage of about 600 keV and a duration of about 2 nsec.

18. The apparatus defined in claim 10, additionally including reflector means positioned adjacent said window-like portions of said vessel means, at one of said reflector means being partially transmissive of the emission from excited lasing species of said gaseous gain medium.

19. The apparatus defined in claim 10, additionally including means for introducing at least one shaped pulse of stimulating radiation into said vessel means, whereby same is amplified by said gaseous gain medium upon the passing of a short, high voltage traveling electromagnetic pulse therethrough.

20. The apparatus defined in claim 19, wherein said stimulating radiation pulse introducing means includes means for generating light of an appropriate wavelength for stimulating radiative transitions in the pumped lasing species of the gain medium, light pulse-shaping means, and means for directing the shaped pulse of stimulating radiation into said vessel means.

* * * * *